(12) United States Patent
Lee et al.

(10) Patent No.: US 12,081,464 B2
(45) Date of Patent: Sep. 3, 2024

(54) TECHNIQUES FOR MODIFYING COMPONENT CARRIER OR LAYER CONFIGURATION IN MULTI-SUBSCRIPTION WIRELESS COMMUNICATIONS

(71) Applicant: QUALCOMM Incorporated, San Diego, CA (US)

(72) Inventors: Kuo-Chun Lee, San Diego, CA (US); Arvind Vardarajan Santhanam, San Diego, CA (US); Reza Shahidi, San Diego, CA (US); Qingxin Chen, San Diego, CA (US); Liangchi Hsu, San Diego, CA (US); Cheol Hee Park, San Diego, CA (US); Mona Agrawal, San Diego, CA (US); Hemanth Kumar Rayapati, San Diego, CA (US); Sridhar Bandaru, Westminster, CO (US)

(73) Assignee: QUALCOMM Incorporated, San Diego, CA (US)

( * ) Notice: Subject to any disclaimer, the term of this patent is extended or adjusted under 35 U.S.C. 154(b) by 498 days.

(21) Appl. No.: 17/453,424

(22) Filed: Nov. 3, 2021

(65) Prior Publication Data

US 2022/0337360 A1 Oct. 20, 2022

Related U.S. Application Data

(60) Provisional application No. 63/176,584, filed on Apr. 19, 2021.

(51) Int. Cl.
*H04L 5/00* (2006.01)
*H04W 76/15* (2018.01)
*H04W 76/30* (2018.01)

(52) U.S. Cl.
CPC .............. *H04L 5/001* (2013.01); *H04W 76/15* (2018.02); *H04W 76/30* (2018.02)

(58) Field of Classification Search
CPC ........ H04L 5/001; H04W 76/15; H04W 76/30
See application file for complete search history.

(56) References Cited

U.S. PATENT DOCUMENTS

| 2018/0160422 A1 | 6/2018 | Pathak et al. |
| 2021/0112554 A1* | 4/2021 | Li ...................... H04W 72/0453 |

FOREIGN PATENT DOCUMENTS

| EP | 3142441 A1 * | 3/2017 | ................ H04J 1/00 |
| EP | 3764717 A2 * | 1/2021 | ............ H04W 12/72 |
| WO | 2020191524 A1 | 10/2020 | |

OTHER PUBLICATIONS

International Search Report and Written Opinion—PCT/US2022/071147—ISA/EPO—Jun. 28, 2022.

* cited by examiner

*Primary Examiner* — Ricky Q Ngo
*Assistant Examiner* — Stephen N Steiner
(74) *Attorney, Agent, or Firm* — Arent Fox Schiff LLP

(57) ABSTRACT

Aspects described herein relate to communicating with multiple cells based on two separate subscriptions stored at the UE in a dual subscription dual standby (DSDS) mode, switching to communicate with the multiple cells in a dual subscription dual active (DSDA) mode, transmitting, to at least one of the multiple cells and based on a number of component carriers allowed for a subscription being exceeded by switching to communicate in the DSDA mode, assistance information to indicate a threshold amount of component carriers for the UE, and transmitting, to at least one of the multiple cells and based on the number of component carriers allowed for the subscription being exceeded by switching to communicate in the DSDA mode, (Continued)

a channel quality indicator (CQI) value for one or more cells of the multiple cells to request deactivation of one or more component carriers with, or release of, the one or more cells.

30 Claims, 8 Drawing Sheets

TECHNIQUES FOR MODIFYING COMPONENT CARRIER OR LAYER CONFIGURATION IN MULTI-SUBSCRIPTION WIRELESS COMMUNICATIONS

CLAIM OF PRIORITY UNDER 35 U.S.C. § 119

The present application for patent claims priority to Provisional Patent Application No. 63/176,584, entitled "TECHNIQUES FOR MODIFYING AN ENVELOPE MODE IN MULTI-SUBSCRIPTION WIRELESS COMMUNICATIONS" filed Apr. 19, 2021, which is assigned to the assignee hereof and hereby expressly incorporated by reference herein for all purposes.

BACKGROUND

Aspects of the present disclosure relate generally to wireless communication systems, and more particularly, to wireless communications by devices using multiple subscriptions.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, devices, including user equipment (UE), can use multiple subscriptions (e.g., based on multiple subscriber identity modules (SIMs) connected to or otherwise usable the UE) to communicate with one or more cells. A UE can communicate in a dual subscription dual standby (DSDS) mode, where the UE can communicate (e.g., in connected state) using a first subscription (e.g., first SIM) while being in standby (e.g., in idle or inactive state) on a second subscription (e.g., second SIM). A UE can communicate in dual subscription dual active (DSDA) mode where the UE can simultaneously transmit and receive using both subscriptions (e.g., both SIMs), namely both subscriptions can be in radio resource control (RRC) CONNECTED state.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication at a user equipment (UE) is provided that includes communicating with multiple cells based on two separate subscriptions stored at the UE in a dual subscription dual standby (DSDS) mode, switching to communicate with the multiple cells in a dual subscription dual active (DSDA) mode, transmitting, to at least one of the multiple cells and based on a number of component carriers allowed for a subscription being exceeded by switching to communicate in the DSDA mode, assistance information to indicate a threshold amount of component carriers for the UE, and transmitting, to at least one of the multiple cells and based on the number of component carriers allowed for the subscription being exceeded by switching to communicate in the DSDA mode, a channel quality indicator (CQI) value for one or more cells of the multiple cells to request deactivation of one or more component carriers with, or release of, the one or more cells.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
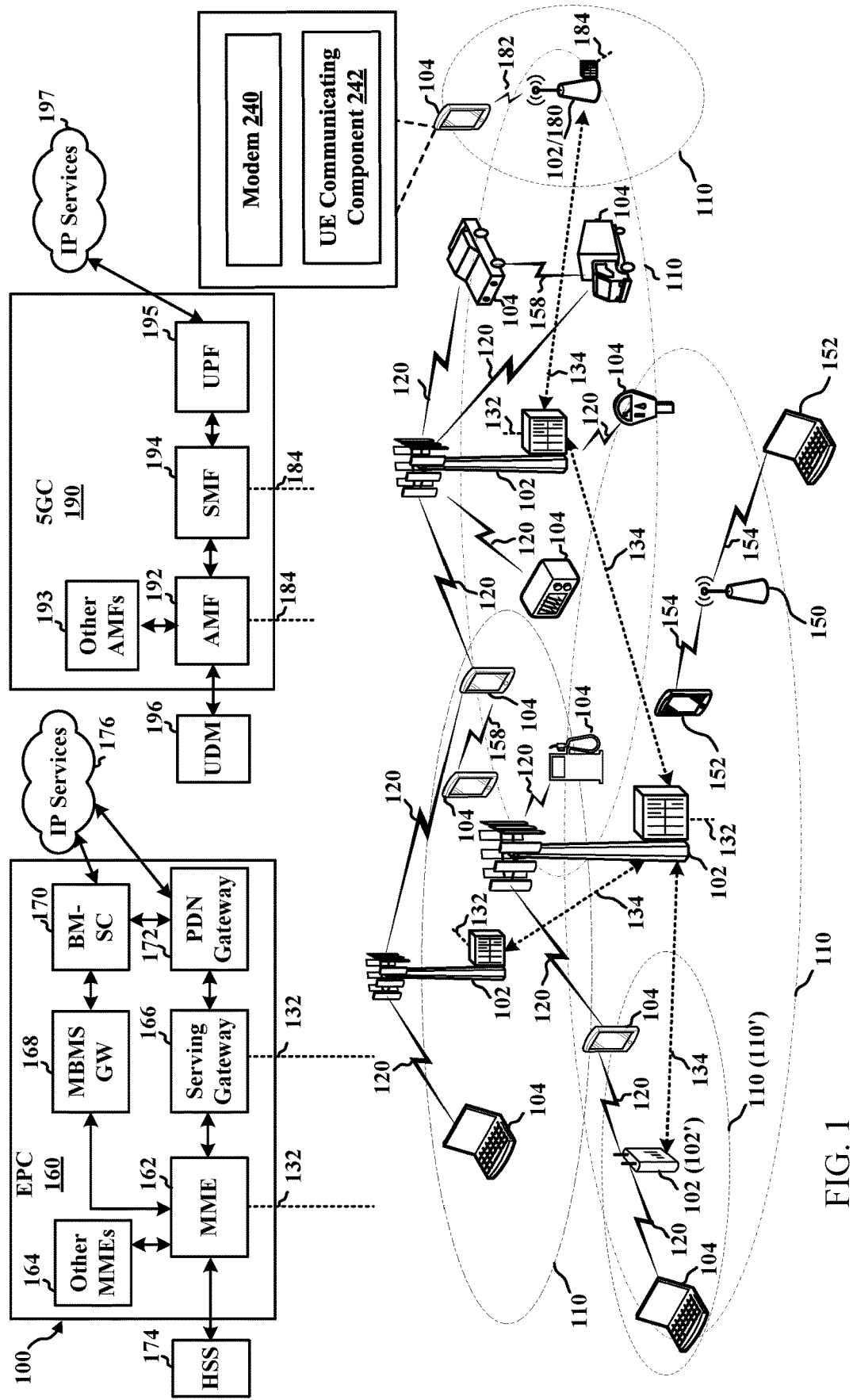
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to modifying a configuration or number of component carriers (CCs), which may be referred to as an envelope mode, for a device in wireless communications. For example, in wireless communication technologies such as fifth generation (5G) new radio (NR), devices, such as user equipment (UE), can communicate according to a maximum envelope mode, where the envelope mode can correspond to a maximum number of CCs, and/or a maximum number of multiple-input multiple-output (MIMO) layers, that the device can use in communicating with other devices or network nodes in a wireless communication network. In addition, the device can be configured to communicate using multiple subscriptions, where each subscription can use a different subscription identity module (SIM) in the device. In one example, the device can communicate using dual SIMS, where the SIMS can be internal to the device and/or on SIM cards inserted into a port or interface of the device. In any case, the SIM can include subscription information for the device to use in communicating (e.g., cellular or other wireless communications) with one or more wireless networks. The device can be configured to communicate in a dual subscription dual standby (DSDS) mode, where the device can communicate using a first subscription while being in standby on a second subscription. The device may also be configured to communicate in dual subscription dual active (DSDA) mode where the device can simultaneously transmit and receive communications using both subscriptions.

In some cases, the device can switch between using DSDS mode and DSDA mode. In DSDA mode, the full baseband and radio frequency (RF) resources to support the maximum number of carriers (e.g., referred to herein as envelope mode) can be considered simultaneously for both subscriptions. In other words, the device splits the envelope mode among both subscriptions. Where DSDA mode is not used frequently, splitting the envelope mode in this regard can have a negative impact on DSDS mode, where the envelope mode is considered for each subscription, such that a given subscription can use the maximum envelope mode. For example, a device can support a total of three downlink (DL) CCs and two uplink (UL) CCs, which can be supported for each of a first subscription (e.g., a default data subscription (DDS)) and a second subscription (e.g., a non-default data subscription (nDDS)) at a given point in time. In the DSDA mode, the device can allocate the resources between the first and second subscriptions (e.g., between DDS and nDDS). For example, the allowed envelope mode can be DDS: two CCs in DL and one CC in UL, nDDS: one CC (for DL and UL), for a total of three DL CCs and two UL CCs. In DSDS mode, however, the allowed envelope mode can be DDS: three DL CCs and two UL CCs, nDDS: three DL CCs and two UL CCs. In DSDS mode, DDS and nDDS can use tune away to share resources because, at a given point in time, one subscription (e.g., one SIM) is active and one subscription (e.g., one SIM) is standby. For example, for a subscription in standby, paging monitoring can be performed in low duty cycle.

It may be possible to use radio capability update procedure (with or without radio capability signalling (RACS) optimization) to signal to the network the envelope mode changes from DSDS to DSDA. The radio capability update procedure, however, may require signaling with both the core network (e.g., via registration request) and the radio access network (RAN) (e.g., via UECapabilityInformation or corresponding inquiry). In addition, the device may need to first release connection to perform the radio capability update procedure, which can interrupt existing service.

Aspects described herein relate to a device modifying an envelope mode per subscription based on whether the device is communicating in a multiple subscription active mode (e.g., DSDA) or a multiple subscription standby mode (e.g., DSDS), or in cases where the device switches the DDS and nDDS. For example, where the device is communicating in DSDS and switches to DSDA, the device can reduce envelope mode on one or more of the subscriptions so as not to violate the envelope mode over all active subscriptions. For example, the device can send assistance information to reduce the number of CCs, and/or the number of MIMO layers, and/or the device can send certain channel quality indicator (CQI) values to avoid communications in certain cells for a subscription. Where the device switches from DSDA to DSDS mode, the device can send assistance information to increase the number of CCs (e.g., restore the deactivated CCs), and/or the number of MIMO layers, and/or the device can send valid CQI values to cause activation or reconfiguration of deactivated cells.

Sending assistance information and/or CQI to modify the envelope mode for multiple subscriptions in this regard can be more efficient than using a radio capability update procedure in that it may use less signaling by only using RAN signals, may reduce complexity in device or network implementation by using existing messages or signaling, etc. The decrease in signaling and in device complexity can save baseband or RF resources of the device, which can improve device efficiency, power consumption, avoid service interruption, and/or improve user experience in wireless communications using such devices and/or networks.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for switching between standby and active multiple subscription modes and accordingly modifying an envelope mode one or more subscriptions, in accordance with aspects described herein. Though a UE 104 is shown as having the modem 240 and UE communicating component 242, this is one illustrative example, and substantially any node or type of node may include a modem 240 and UE communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, a UE 104 can communicate using multiple subscriptions in either a multiple subscription standby mode (e.g., DSDS) or a multiple subscription active mode (e.g., DSDA). Based on switching between modes, UE communicating component 242 can modify an envelope mode for one or more subscriptions to ensure the UE 104 does not exceed a maximum envelope mode. For example, where multiple subscriptions are simultaneously active by the mode switch, UE communicating component 242 can reduce an envelope mode on one or more subscriptions to allow the total envelope mode for both subscriptions to not exceed the maximum envelope mode for the UE 104. In another example, where at least one subscription is on standby (e.g., such that the UE 104 briefly tunes away from the active subscription(s) for paging signal monitoring on the standby subscription), UE communicating component 242 may increase the envelope mode on one or more of the subscriptions to maximize the envelope mode at the UE 104 when communicating using one (or more) of the active subscriptions.

Figure 2:
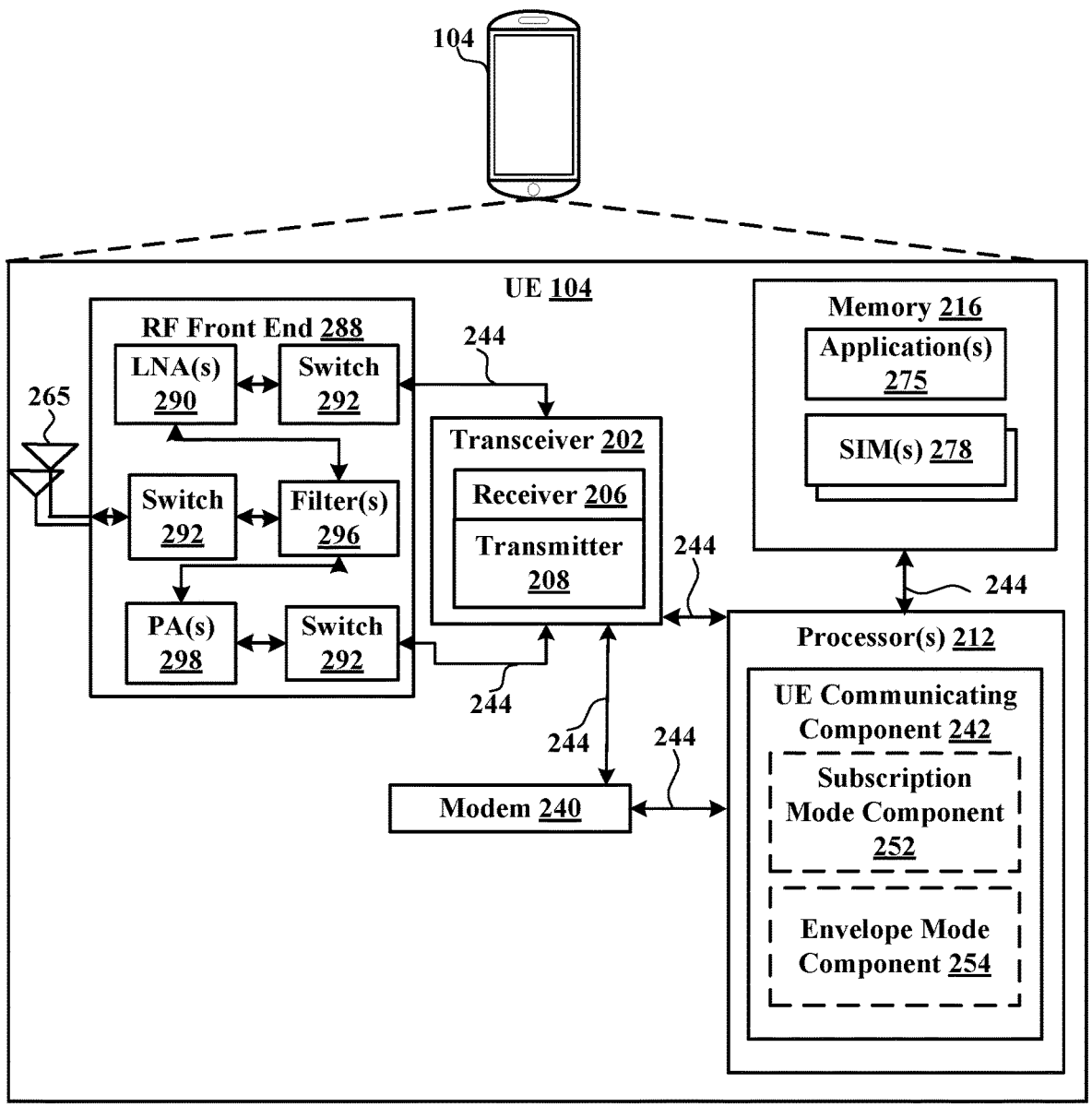
FIG. 2 is a block diagram illustrating an example of a UE, in accordance with various aspects of the present disclosure.
Figure 3:
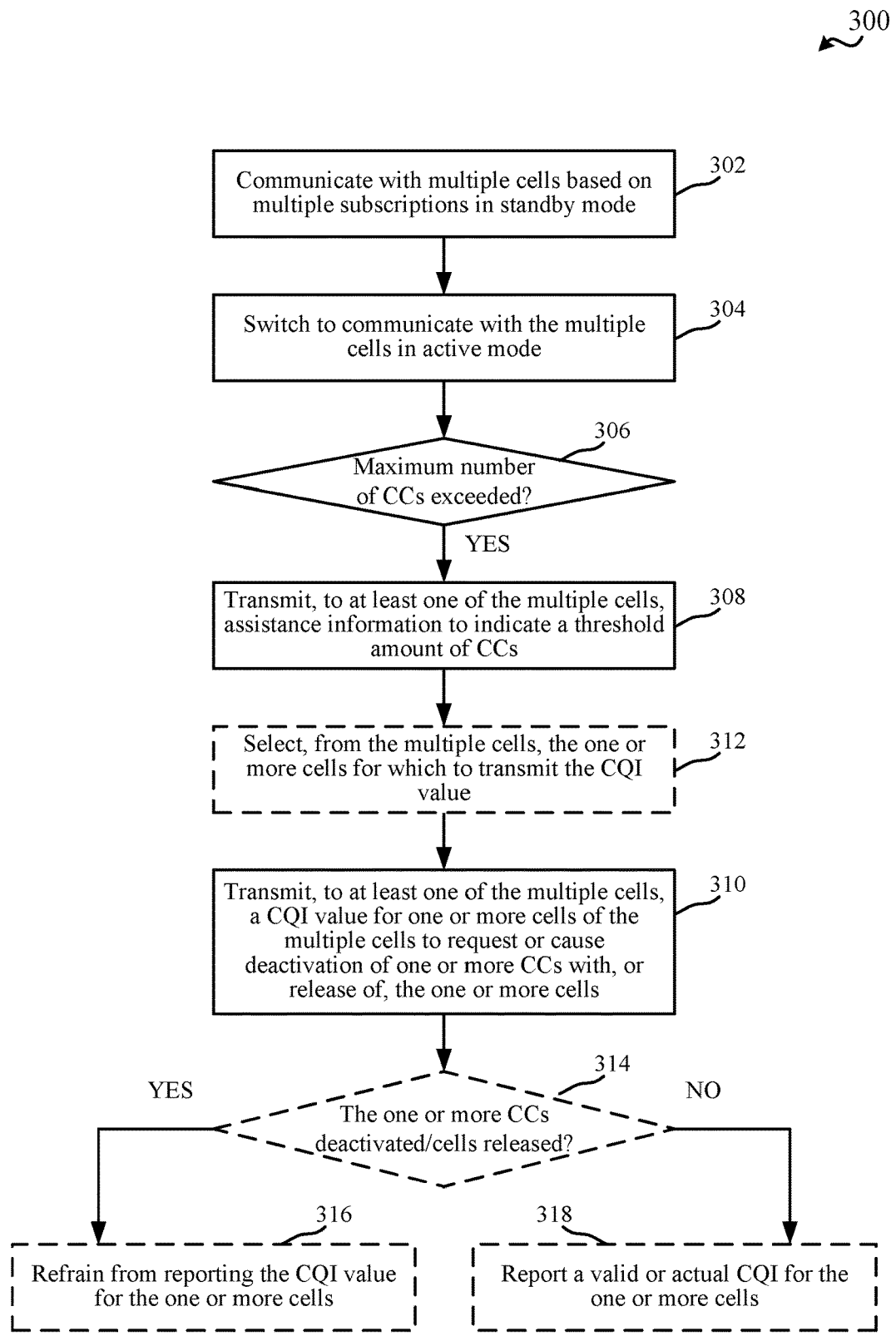
FIG. 3 is a flow chart illustrating an example of a method for modifying a component carrier (CC) or layer configuration based on switching from a multiple subscription standby mode to a multiple subscription active mode, in accordance with aspects described herein.
Figure 4:
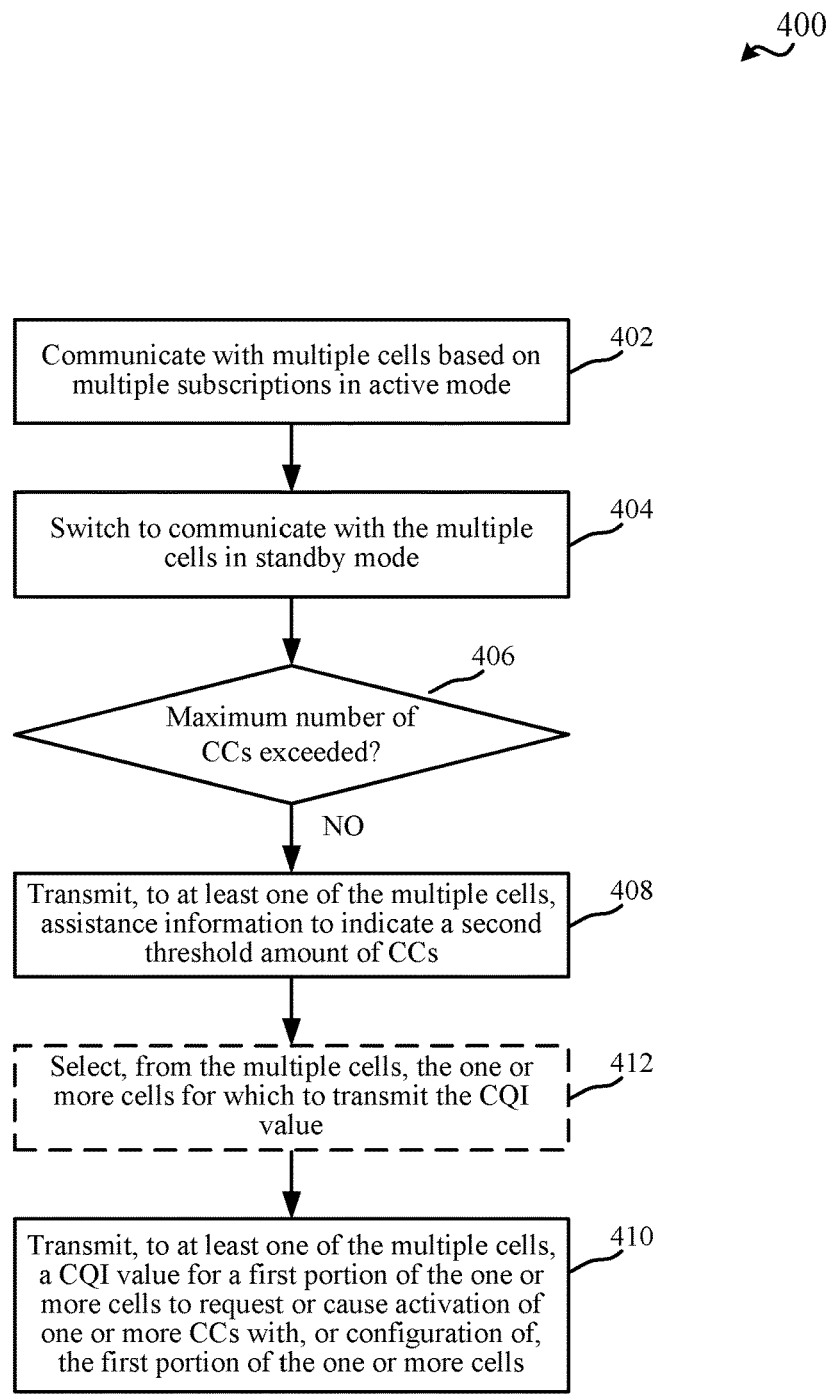
FIG. 4 is a flow chart illustrating an example of a method for modifying a CC or layer configuration based on switching from a multiple subscription active mode to a multiple subscription standby mode, in accordance with aspects described herein.
Figure 5:
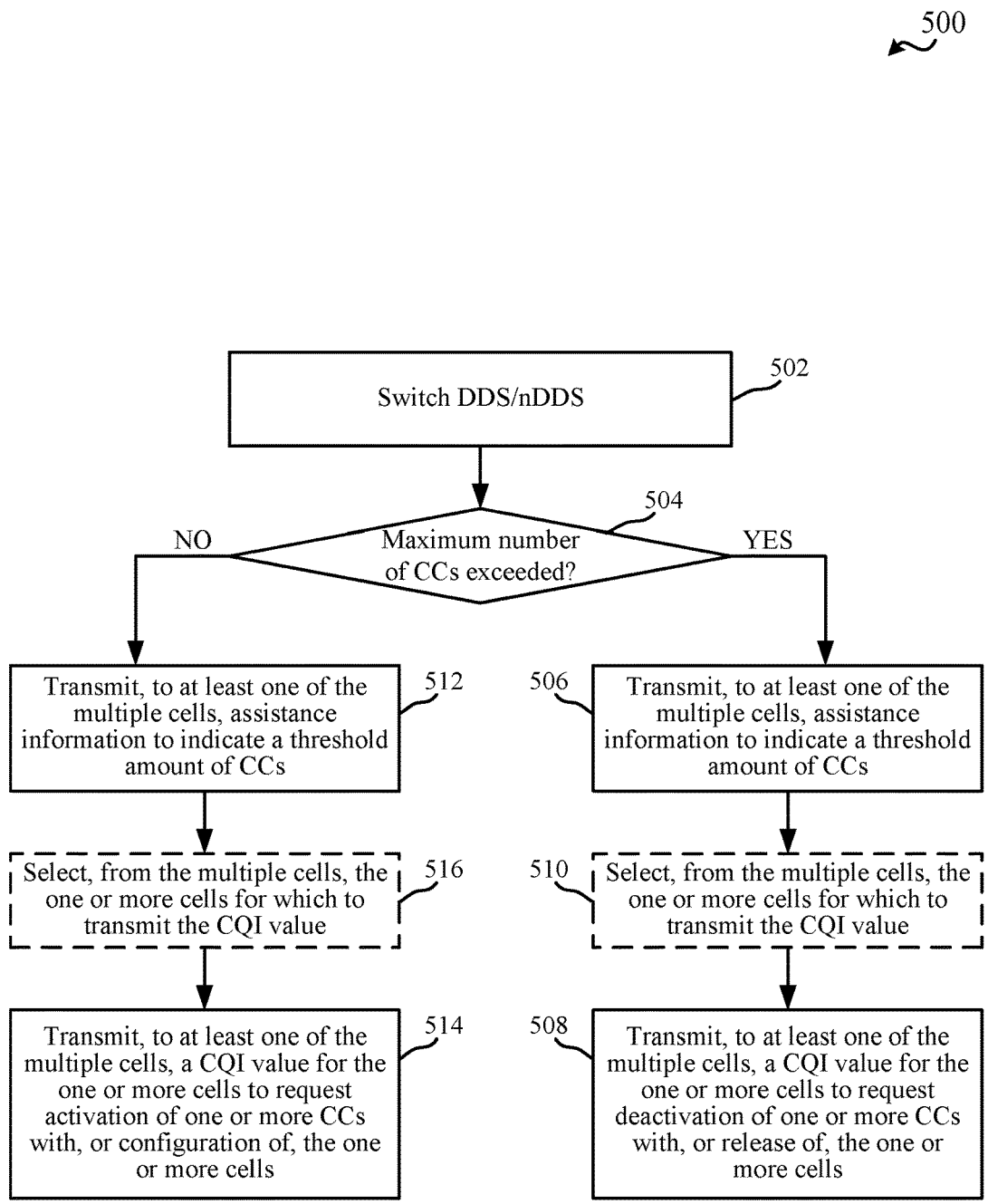
FIG. 5 is a flow chart illustrating an example of a method modifying a CC or layer based on switching the default data subscription (DDS) and the non-DDS, in accordance with aspects described herein.

Turning now to FIGS. 2-8, aspects are depicted with reference to one or more components and one or more methods that may perform the actions or operations described herein, where aspects in dashed line may be optional. Although the operations described below in FIGS. 3-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for switching between standby and active multiple subscription modes and accordingly modifying an envelope mode one or more subscriptions, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

In addition, memory 216 may include or may be coupled with or provide multiple SIMS 278 for providing each of multiple subscriptions. For example, UE 104 can include the multiple SIMS 278 as separate SIM cards that can be electronically coupled to the UE 104 (e.g., in SIM card slots), SIMS that are hardcoded in memory 216 or other portion of the UE 104, etc. The UE 104 can use the multiple SIMS 278 for communicating using multiple subscriptions, such as DSDS or DSDA modes, as described herein. Thus, for example, the UE 104 can use one SIM 278 for communicating with one or more cells over multiple CCs (e.g., as a DDS) and another SIM 278 for communicating with one or more other cells over multiple CCs (e.g., as a nDDS).

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can optionally include a subscription mode component 252 for switching between subscription modes for communicating in a wireless network, and/or an envelope mode component 254 for modifying an envelope mode on one or more subscriptions based on the switching, in accordance with aspects described herein.

In an aspect, the processor(s) 212 may correspond to one or more of the processors described in connection with the UE in FIG. 8. Similarly, the memory 216 may correspond to the memory described in connection with the UE in FIG. 8.

FIG. 3 illustrates a flow chart of an example of a method 300 for modifying a CC or layer configuration based on switching from a multiple subscription standby mode to a multiple subscription active mode, in accordance with aspects described herein. In an example, a UE 104 can perform the functions described in method 300 using one or more of the components described in FIGS. 1-2.

In method 300, at Block 302, multiple cells can be communicated with in standby mode based on multiple subscriptions. In an aspect, subscription mode component 252, e.g., in conjunction with processor(s) 212, memory 216, transceiver 202, UE communicating component 242, etc., can communicate with multiple cells based on multiple subscriptions in standby mode. For example, subscription mode component 252 can manage a subscription mode for communicating with multiple cells over multiple CCs, such as DSDS mode where the UE 104 can communicate with one or more cells over multiple CCs using an active subscription (e.g., DDS) and periodically tune away to monitor paging signals on a standby subscription (e.g., nDDS). In an example, subscription mode component 252 can switch between the DDS and nDDS (e.g., such that nDDS becomes the active subscription and DDS becomes the standby subscription) for a period of time in different scenarios, such as where DDS is not available, where communication quality of a cell or CC(s) for nDDS are at least a threshold better than DDS, where the UE 104 receives a paging signal or other command for a voice or data call in the nDDS, etc. In any case in DSDS mode, however, the UE 104 at a given point in time is communicating with one subscription—e.g., one subscription as an active subscription and one or more subscriptions as a standby subscription to tune away from the active subscription. Thus, the UE 104 can use maximum envelope mode with each subscription.

In method 300, at Block 304, a switch can be performed to communicate with the multiple cells in active mode. In an aspect, subscription mode component 252, e.g., in conjunction with processor(s) 212, memory 216, transceiver 202, UE communicating component 242, etc., can switch to communicate with the multiple cells in active mode. For example, subscription mode component 252 can switch to manage the subscription mode for communicating with the multiple cells over multiple CCs using the multiple subscriptions simultaneously, such as in DSDA mode. In some specific examples, subscription mode component 252 can switch to DSDA mode when both subscriptions are to be activated, such as where both subscriptions receive or initiate voice or data calls (e.g., in the same or overlapping time periods). In this regard, the UE 104 may violate the maximum envelope mode by the simultaneous communications if it uses the maximum envelope mode for each subscription—e.g., as configured for DSDS mode. For example, where each subscription is allotted the maximum envelope mode for maximum number of CCs (or maximum number of MIMO layers), the UE 104 may use more CCs (or MIMO layers) than the maximum envelope mode in simultaneously communicating over the CCs (or MIMO layers) of both (or more than one) subscriptions.

In method 300, at Block 306, it can be determined whether a maximum number of CCs, which is also referred to herein as an envelope mode, is (or may be) exceeded. In an aspect, envelope mode component 254, e.g., in conjunction with processor(s) 212, memory 216, transceiver 202, UE communicating component 242, etc., can determine whether the maximum number of CCs for the UE is (or may be) exceeded. For example, envelope mode component 254 can determine the total number of CCs (or MIMO layers) for all active subscriptions and can determine whether this total number exceeds the maximum number of CCs. In an example, the maximum number of CCs may have been previously indicated by the UE 104 to the base station 102 in UE capability information, configured by the base station 102 for the UE 104, and/or may be based on a UE capability, a UE class, available processing power or other resources at the UE 104, etc.

In method 300, where the maximum number of CCs is (or may be) exceeded at Block 306, at Block 308 assistance information to indicate a threshold amount of CCs can be transmitted to at least one of the multiple cells. In an aspect, envelope mode component 254, e.g., in conjunction with processor(s) 212, memory 216, transceiver 202, UE communicating component 242, etc., can transmit, to at least one of the multiple cells, the assistance information to indicate the threshold amount of CCs. In one example, the assistance information can indicate a reduction in the maximum number of CCs supported by the UE 104 to cause a reduction in the number of CCs on one or more subscriptions to allow meeting (e.g., not exceeding) the previously indicated maximum number of CCs when using both subscriptions.

For example, envelope mode component 254 can transmit the assistance information to a primary cell (PCell) of one or more of the active subscriptions (e.g., the DDS, nDDS, or both). This can cause the PCell to reduce the number of CCs (or MIMO layers) activated for the UE 104. In one example, envelope mode component 254 can transmit the assistance information in radio resource control (RRC) UE assistance information (UAI), as defined in 5G NR. In one specific example, envelope mode component 254 can transmit an OverheatingAssistance information element (IE) with a reducedMaxCCs value to cause the PCell to reduce the maximum number of (DL and/or UL) CCs activated for the UE 104 in a master cell group (MCG) and/or a secondary cell group (SCG). In another specific example, envelope mode component 254 can transmit an UEAssistanceInformation IE with a maxCC-Preference value to cause the PCell to reduce the maximum number of CCs activated for the UE 104 in the MCG and/or SCG.

For example, when indicated to address overheating, this maximum number of CCs can include the total number of CCs supported simultaneously for both secondary cells (SCells) of the NR MCG and primary SCell (PSCell)/SCells of the SCG. This maximum number can include PSCell/SCells of the SCG in E-UTRA-NR dual connectivity (DC) (EN-DC), NG-RAN-E-UTRA-NR DC (NGEN-DC), NR-E-UTRA DC (NE-DC), etc. When indicated to address power saving, this maximum number can include PSCell/SCells of the cell group with which this UE assistance information is associated. The maximum number of downlink SCells can range up to the current active configuration when indicated to address power savings.

In another example, the UE can send the assistance information as, or in, a channel state information (CSI) report, which may include a rank indicator to cause reduction in rank (e.g., to reduce the envelope mode as related to MIMO layers). For example, envelope mode component 254 can send rank indicator (RI)=2 if MIMO layer should be reduced from 4 to 2 based on the mode switch.

In addition, in method 300, where the maximum number of CCs is (or may be) exceeded at Block 306, at Block 310, for one or more cells of the multiple cells, a CQI value to request or cause deactivation of one or more CCs with, or release of, the one or more cells can be transmitted. In an aspect, envelope mode component 254, e.g., in conjunction with processor(s) 212, memory 216, transceiver 202, UE communicating component 242, etc., can transmit, to at least one of the multiple cells, the CQI value for one or more cells of the multiple cells to request or cause deactivation of one or more CCs with, or release of, the one or more cells. For example, the CQI value can be an out-of-range CQI value that may not be defined as a valid CQI value (e.g., in a wireless communication technology, such as 5G NR). In one example, the out-of-range CQI value can be CQI=0. In any case, the reported CQI value can cause the PCell or network to deactivate one or more CCs, or release the one or more corresponding cells, with which the UE 104 was communicating over one or more CCs. In an example, communicating component 242 may receive, from a PCell or other cell associated with an SCell being deactivated or released, an indication of deactivation of the CCs or release of the SCell. UE communicating component 242 can accordingly refrain from communicating with the SCell to comply with the reduced envelope mode for the associated subscription. In an example, the assistance information can be transmitted, at Block 308, and/or the CQI value can be transmitted, at Block 310, for each of the multiple subscriptions to reduce the envelope mode (e.g., the number of CCs being used) on both subscriptions.

In method 300, optionally at Block 312, the one or more cells for which to transmit the CQI value can be selected from the multiple cells. In an aspect, envelope mode component 254, e.g., in conjunction with processor(s) 212, memory 216, transceiver 202, UE communicating component 242, etc., can select, from the multiple cells, the one or more cells for which to transmit the CQI value. For example, envelope mode component 254 can select one or subset of SCells to send CQI=0 and motivate the network to select SCell with CQI=0 to release or deactivate corresponding CCs; that is, the network can typically choose the SCell with the lowest CQI to release or deactivate CCs upon receiving UAI to reduce CCs. In an example, envelope mode component 254 can select whichever SCell has least throughput or least bandwidth of active bandwidth part (BWP), whichever SCell is using a certain frequency range (FR) (e.g., FR1 and not FR2), etc. to preserve the data rate.

In method 300, optionally at Block 314, it can be determined whether the one or more CCs are deactivated or cells released. In an aspect, envelope mode component 254, e.g., in conjunction with processor(s) 212, memory 216, transceiver 202, UE communicating component 242, etc., can determine whether the one or more CCs (e.g., as selected and form which the CQI value is transmitted) are deactivated or corresponding cells released. If so, at Block 316, reporting the CQI value for the one or more cells can be refrained from. In this example, envelope mode component 254 can refrain from reporting the CQI value for the one or more cells as the one or more CCs have been deactivated or cells have been otherwise released. If the one or more cells are determined to not have been deactivated or released at Block 314, optionally at Block 318, a valid or actual CQI can be reported for the one or more cells. In this example, envelope mode component 254 can continue reporting CQI for the one or more cells as normal (e.g., as an actual CQI value).

FIG. 4 illustrates a flow chart of an example of a method 400 for modifying a CC or layer configuration based on switching from a multiple subscription active mode to a multiple subscription standby mode, in accordance with aspects described herein. In an example, a UE 104 can perform the functions described in method 400 using one or more of the components described in FIGS. 1-2.

In method 400, at Block 402, multiple cells can be communicated with in active mode based on multiple subscriptions. In an aspect, subscription mode component 252, e.g., in conjunction with processor(s) 212, memory 216, transceiver 202, UE communicating component 242, etc., can communicate with multiple cells based on multiple subscriptions in active mode, as described above. For example, subscription mode component 252 can manage a subscription mode for communicating with multiple cells over multiple CCs simultaneously using multiple subscriptions simultaneously, such as DSDA mode.

In method 400, at Block 404, a switch can be performed to communicate with the multiple cells in standby mode. In an aspect, subscription mode component 252, e.g., in conjunction with processor(s) 212, memory 216, transceiver 202, UE communicating component 242, etc., can switch to communicate with the multiple cells in standby mode. For example, subscription mode component 252 can switch to manage the subscription mode for communicating with the multiple cells over multiple CCs using the multiple subscriptions, such as in DSDS mode, where only one (or less than all) subscription is active at a given point in time.

In method 400, at Block 406, it can be determined whether the maximum number of CCs is (or may be) exceeded. In an aspect, envelope mode component 254, e.g., in conjunction with processor(s) 212, memory 216, transceiver 202, UE communicating component 242, etc., can determine whether the maximum number of CCs is (or may be) exceeded (e.g., for a given subscription). For example, envelope mode component 254 can determine the number of CCs (or MIMO layers) for a given subscription and can determine whether this number exceeds the maximum number of CCs. For example, the maximum number of CCs can be the maximum number reported in assistance information when the UE 104 switched to DSDA mode (e.g., as described in reference to method 300 in FIG. 3).

In method 400, where the maximum number of CCs is not (or may not be) exceeded at Block 406, at Block 408, assistance information to indicate a second threshold amount of CCs can be transmitted to at least one of the multiple cells. In an aspect, envelope mode component 254, e.g., in conjunction with processor(s) 212, memory 216, transceiver 202, UE communicating component 242, etc., can transmit, to at least one of the multiple cells, the assistance information to indicate the second threshold amount of CCs. In an example, the second threshold amount of CCs may be an increase over the previously indicated maximum number of CCs (e.g., the maximum number indicated when the UE 104 previously entered DSDA mode). For example, envelope mode component 254 can transmit the assistance information to a PCell of the given subscription. This can cause the PCell to increase the maximum number of CCs (or MIMO layers) activated for the UE 104. In one example, envelope mode component 254 can transmit the assistance information in RRC transmitted UAI, as defined in 5G NR. For example, envelope mode component 254 can transmit a UEAssistanceInformation IE with a maxCC-Preference value to cause or allow the PCell to increase the maximum number of CCs activated for the UE 104 in the MCG and/or SCG.

In another example, the UE can send the assistance information as, or in, a CSI report, which may include a rank indicator to cause increase in rank (e.g., to increase the envelope mode as related to MIMO layers). For example, envelope mode component 254 can send rank indicator (RI)=4 if MIMO layer should be increased from 2 to 4 based on the mode switch.

In addition, in method 400, where the maximum number of CCs is not (or may not be) exceeded at Block 406, at Block 410, for a first portion of the one or more cells of the multiple cells, a CQI value to request or cause activation of communications with, or configuration of, the one or more cells can be transmitted. In an aspect, envelope mode component 254, e.g., in conjunction with processor(s) 212, memory 216, transceiver 202, UE communicating component 242, etc., can transmit, to at least one of the multiple cells, the CQI value for the first portion of the one or more cells to request or cause activation of one or more CCs with, or configuration of, the first portion of the one or more cells. For example, the CQI value can be an actual CQI value for the one or more cells, which can cause the PCell or network to activate (or reactivate) the one or more CCs, or configure (or reconfigure) the one or more corresponding cells, with which the UE 104 was communicating over one or more CCs. In an example, the assistance information can be transmitted, at Block 408, and/or the CQI value can be transmitted, at Block 410, for each of the multiple subscriptions to increase the number of CCs on both (or all) subscriptions.

In method 400, optionally at Block 412, the one or more cells for which to transmit the CQI value can be selected from the multiple cells. In an aspect, envelope mode component 254, e.g., in conjunction with processor(s) 212, memory 216, transceiver 202, UE communicating component 242, etc., can select, from the multiple cells, the one or more cells for which to transmit the CQI value. For example, envelope mode component 254 can select one or subset of SCells to send the actual CQI value to motivate the network to select SCell favorable CQI to activate.

Figure 6:
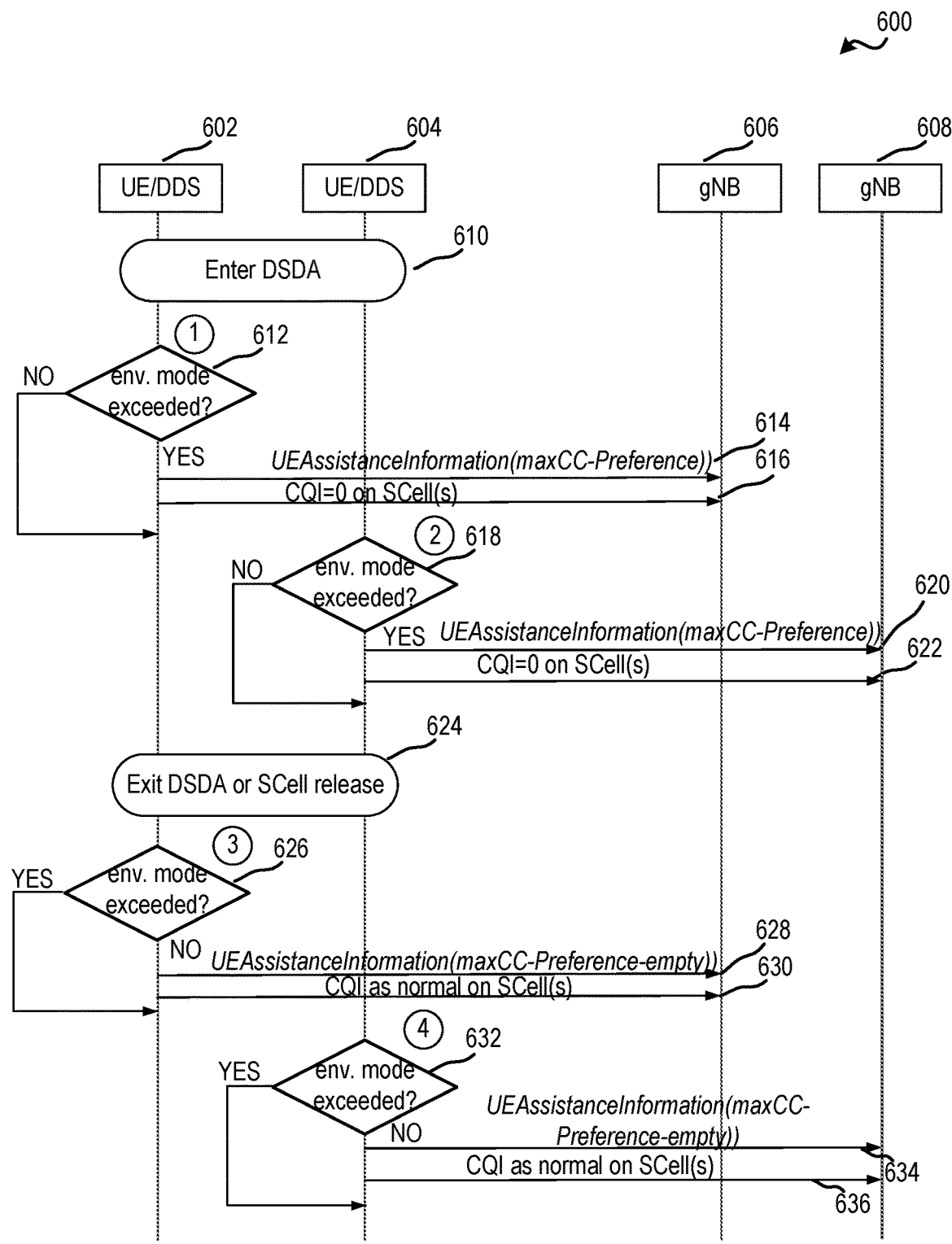
FIG. 6 illustrates an example of a system for modifying envelope mode for one or more subscriptions based on a multiple subscription mode, in accordance with various aspects of the present disclosure.

FIG. 6 illustrates an example of a system 600 for modifying envelope mode for one or more subscriptions based on a multiple subscription mode. System 600 includes a multiple-subscription UE with a UE DDS 602 and UE nDDS 604, which can be subscriptions in the same UE as described, a gNB 606 related to a subscription (e.g., the DDS), and another gNB 608 related to another subscription (e.g., nDDS). In system 600, the UE can be communicating in DSDS mode. At 610, the UE can enter DSDA, and in call flow 1, at 612, the UE DDS 602 can determine if the envelope mode is exceeded for DDS (e.g., by the addition of concurrent communications with nDDS). If so, at 614, the UE DDS 602 can send UE assistance information to gNB 606 with a reduced maxCC-Preference value, and at 616 can transmit CQI=0 for one or more SCells to cause gNB 606 to deactivate or release connection to the SCells to reduce the envelope mode for DDS. Similarly, for example in call flow 2, at 618, the UE nDDS 604 can determine if the envelope mode is exceeded for nDDS (e.g., by the addition of concurrent communications with nDDS). If so, at 620, the UE nDDS 604 can send UE assistance information to gNB 608 with a reduced maxCC-Preference value, and at 622 can transmit CQI=0 for one or more SCells to cause gNB 608 to deactivate or release connection to the SCells to reduce the envelope mode for nDDS.

After a period of time of communicating in DSDA mode, at 624, the UE can exit DSDA or release SCells (e.g., and enter DSDS). In this example, in call flow 3, at 626, the UE DDS 602 can determine if the envelope mode is exceeded for DDS. If not, at 628, the UE DDS 602 can send UE assistance information to gNB 606 with an increased maxCC-Preference value, and at 630 can transmit actual CQI value for one or more SCells to cause gNB 606 to activate the SCells to increase the envelope mode for DDS. Similarly, for example in call flow 4, at 632, the UE nDDS 604 can determine if the envelope mode is exceeded for nDDS. If not, at 634, the UE nDDS 604 can send UE assistance information to gNB 608 with an increased maxCC-Preference value, and at 636 can transmit actual CQI value for one or more SCells to cause gNB 608 to activate the SCells to increase the envelope mode for nDDS.

In this example in FIG. 6, in the call flow 1 or 2, after entering DSDA, if DDS or nDDS UE has more SCells activated than allowed envelope mode, then UE of DDS or nDDS can use UAI to reduce CCs and send CQI=0 on the SCell(s) which exceeds the allowed envelope mode. In the call flow 3 or 4, for example, after exiting DSDA (and entering DSDS) or SCell is released and there is no need to reduce CCs, UE of DDS or nDDS can use UAI to restore CCs by not including any preference values and send CQI with normal values on the SCell(s).

Figure 7:
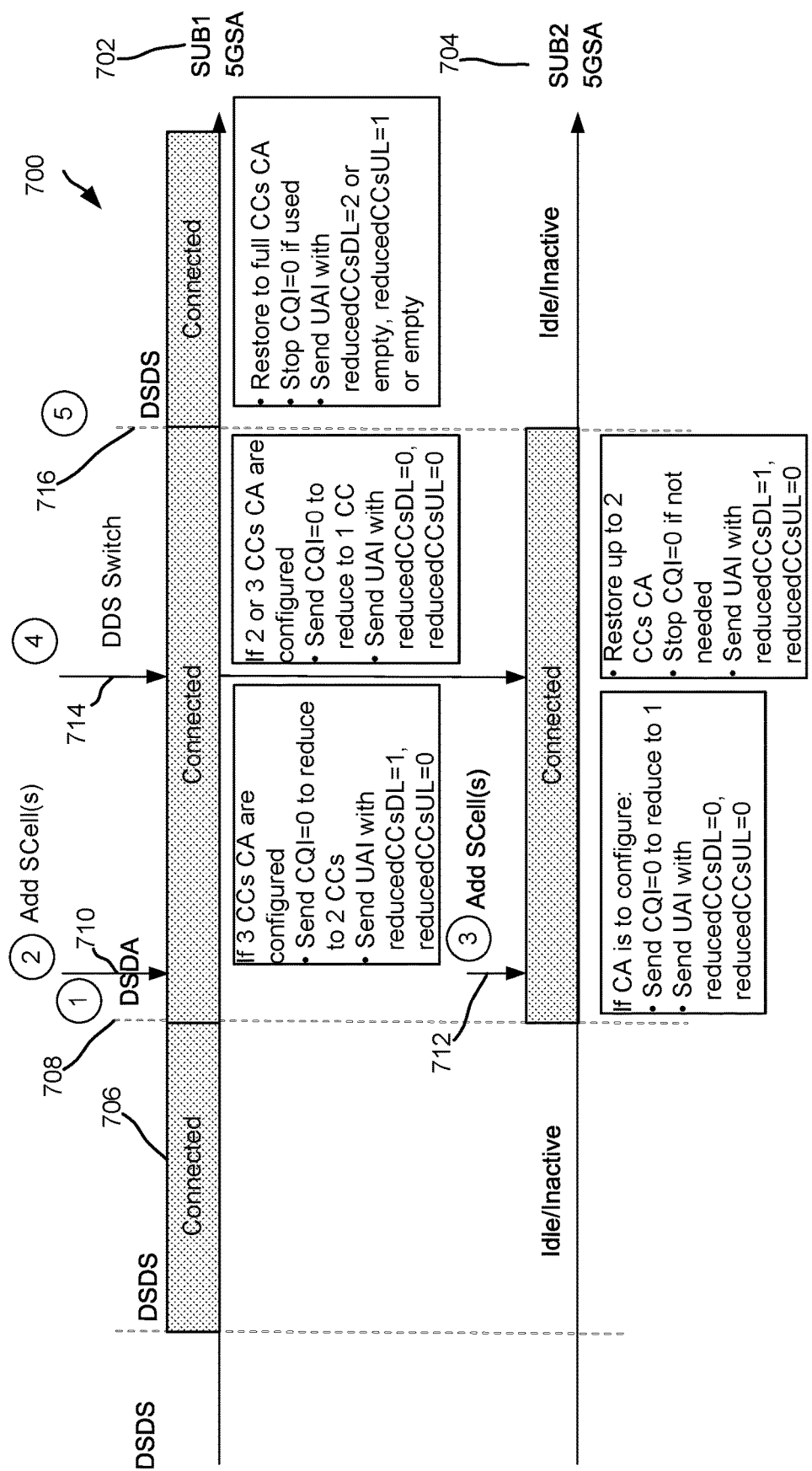
FIG. 7 illustrates an example of a timeline for modifying envelope mode for one or more subscriptions based on a multiple subscription mode, in accordance with various aspects of the present disclosure.

FIG. 7 illustrates an example of a timeline 700 for modifying envelope mode for one or more subscriptions based on a multiple subscription mode. Timeline 700 illustrates two subscriptions for a UE, including subscription 1 (SUB1) 702 and subscription 2 (SUB2) 704, which can be 5G standalone (5GSA). At 706, SUB1 can be connected in DSDS, and in which SUB2 704 is in standby (e.g., RRC idle or RRC inactive). In this mode, the envelope mode in DSDS can be three DL CCs and two UL CCs in DDS (SUB1) and three DL CCs and two UL CCs in nDDS (SUB2). At 708, the UE can enter DSDA mode when DDS and nDDS are in the RRC CONNECTED state (e.g., such that SUB1 702 is connected and SUB2 704 is connected). Having both subscriptions in RRC CONNECTED state using the configured envelope mode for each subscription may cause the UE to exceed the maximum envelope mode. Accordingly, for SUB1 702, at 710, in DSDA, the network can reconfigure or already configure DDS UE (SUB1 702) with more than two DL SCell or more than one UL SCell. Accordingly, the UE DDS can send CQI=0 to reduce to two CCs and can send UAI with reducedCCsDL=1 to decrease to two DL CCs and reducedCCsUL=0 to decrease to one UL CC. Similarly, for example, for SUB2 704, at 712, in DSDA, the network can reconfigure or already configure UE nDDS (SUB1 702) with carrier aggregation (CA) or to add CA. Accordingly, the UE nDDS can send CQI=0 to reduce to one CC and can send UAI with reducedCCsDL=0 to decrease to one DL CC and reducedCCsUL=0 to decrease to one UL CC, which can yield the same maximum envelope mode of five CCs.

In addition, in an example, UE may switch the DDS to be SUB2 704 and the nDDS to be SUB1 at 714. In this regard, the UE can similarly modify the envelope mode for the subscriptions to switch the DDS. For example, for SUB1, the UE nDDS, if already configured with CA, can reduce the envelope mode to one DL CC and one UL CC by sending CQI=0 on the SCell being reduced and UAI with reducedCCsDL=0 to decrease to one DL CC and reducedCCsUL=0. Similarly, the UE DDS, for SUB2 704, can increase the envelope mode by sending actual CQI for an SCell and UAI with reducedCCsDL=1 to increase to two DL CCs and reducedCCsUL=0. This is further described with reference to FIG. 5 below.

At 716, the UE can switch back to DSDS with SUB1 702 being the DDS, which may include releasing the nDDS connection (e.g., with SUB2 704). In this example, the UE can increase the envelope mode for SUB1 702 back to three DL CCs and two UL CCs by sending actual CQI for one or more SCells and UAI with reducedCCsDL=2 (or empty value which can indicate no more preference in reduction) to increase to three DL CCs and reducedCCsUL=1 (or empty value which can indicate no more preference in reduction) to increase to two UL CCs. The UE can be inactive on SUB2 704 in DSDS.

FIG. 5 illustrates a flow chart of an example of a method 500 for modifying a CC or layer configuration based on switching the DDS and nDDS, in accordance with aspects described herein. In an example, a UE 104 can perform the functions described in method 500 using one or more of the components described in FIGS. 1-2.

In method 500, at Block 502, a switch between the DDS and nDDS can be performed. In an aspect, subscription mode component 252, e.g., in conjunction with processor(s) 212, memory 216, transceiver 202, UE communicating component 242, etc., can switch the DDS and nDDS. For example, subscription mode component 252 can switch a first subscription that is the DDS to nDDS and can switch a second subscription that is nDDS to DDS. In an example, where the UE 104 is in DSDA mode, this may cause the first subscription to exceed maximum envelope mode (e.g., maximum number of CCs) for nDDS and/or second subscription to not achieve the maximum envelope mode for DSDS.

In method 500, at Block 504, it can be determined whether the maximum number of CCs is (or may be) exceeded for a given subscription. In an aspect, envelope mode component 254, e.g., in conjunction with processor(s) 212, memory 216, transceiver 202, UE communicating component 242, etc., can determine whether the maximum number of CCs is (or may be) exceeded for the given subscription, as described.

In method 500, where the maximum number of CCs is (or may be) exceeded for a given subscription at Block 504, at Block 506 assistance information to indicate a threshold amount of CCs can be transmitted to at least one of the multiple cells. In an aspect, envelope mode component 254, e.g., in conjunction with processor(s) 212, memory 216, transceiver 202, UE communicating component 242, etc., can transmit, to at least one of the multiple cells, the assistance information to indicate the threshold amount of CCs. As described, for example, the threshold amount may be a reduction of a previous amount to cause lowering the number of CCs for the subscription. For example, envelope mode component 254 can transmit the assistance information to a primary cell (PCell) of the first subscription (e.g., where the first subscription is switched from DDS to nDDS), as described.

In addition, in method 500, where the maximum number of CCs is (or may be) exceeded for a given subscription at Block 504, at Block 508, for one or more cells of the multiple cells, a CQI value to request deactivation of one or more CCs with, or release of, the one or more cells can be transmitted. In an aspect, envelope mode component 254, e.g., in conjunction with processor(s) 212, memory 216, transceiver 202, UE communicating component 242, etc., can transmit, to at least one of the multiple cells, the CQI value for the one or more cells to request deactivation of one or more CCs with, or release of, the one or more cells of the first subscription (e.g., where the first subscription is switched from DDS to nDDS), as described.

In method 500, optionally at Block 510, the one or more cells for which to transmit the CQI value can be selected from the multiple cells. In an aspect, envelope mode component 254, e.g., in conjunction with processor(s) 212, memory 216, transceiver 202, UE communicating component 242, etc., can select, from the multiple cells, the one or more cells for which to transmit the CQI value, as described above.

In method 500, where the maximum number of CCs is not (or may not be) exceeded for a given subscription at Block 504, at Block 512 assistance information to indicate a threshold amount of CCs can be transmitted to at least one of the multiple cells. In an aspect, envelope mode component 254, e.g., in conjunction with processor(s) 212, memory 216, transceiver 202, UE communicating component 242, etc., can transmit, to at least one of the multiple cells, the assistance information to indicate a threshold amount of CCs of the second subscription (e.g., where the second subscription is switched from nDDS to DDS), as described. For example, the threshold amount may be an increase of a previous amount to cause increase in the number of CCs for the subscription.

In addition, in method 500, where the maximum number of CCs is not (or may not be) exceeded for the given subscription at Block 504, at Block 514, for one or more cells of the multiple cells, a CQI value to request activation of one or more CCs with, or configuration of, the one or more cells can be transmitted. In an aspect, envelope mode component 254, e.g., in conjunction with processor(s) 212, memory 216, transceiver 202, UE communicating component 242, etc., can transmit, to at least one of the multiple cells, the CQI value for the one or more cells to request activation of one or more CCs with, or configuration of, the one or more cells of the second subscription (e.g., where the second subscription is switched from nDDS to DDS), as described.

In method 500, optionally at Block 516, the one or more cells for which to transmit the CQI value can be selected from the multiple cells. In an aspect, envelope mode component 254, e.g., in conjunction with processor(s) 212, memory 216, transceiver 202, UE communicating component 242, etc., can select, from the multiple cells, the one or more cells for which to transmit the CQI value, as described.

Figure 8:
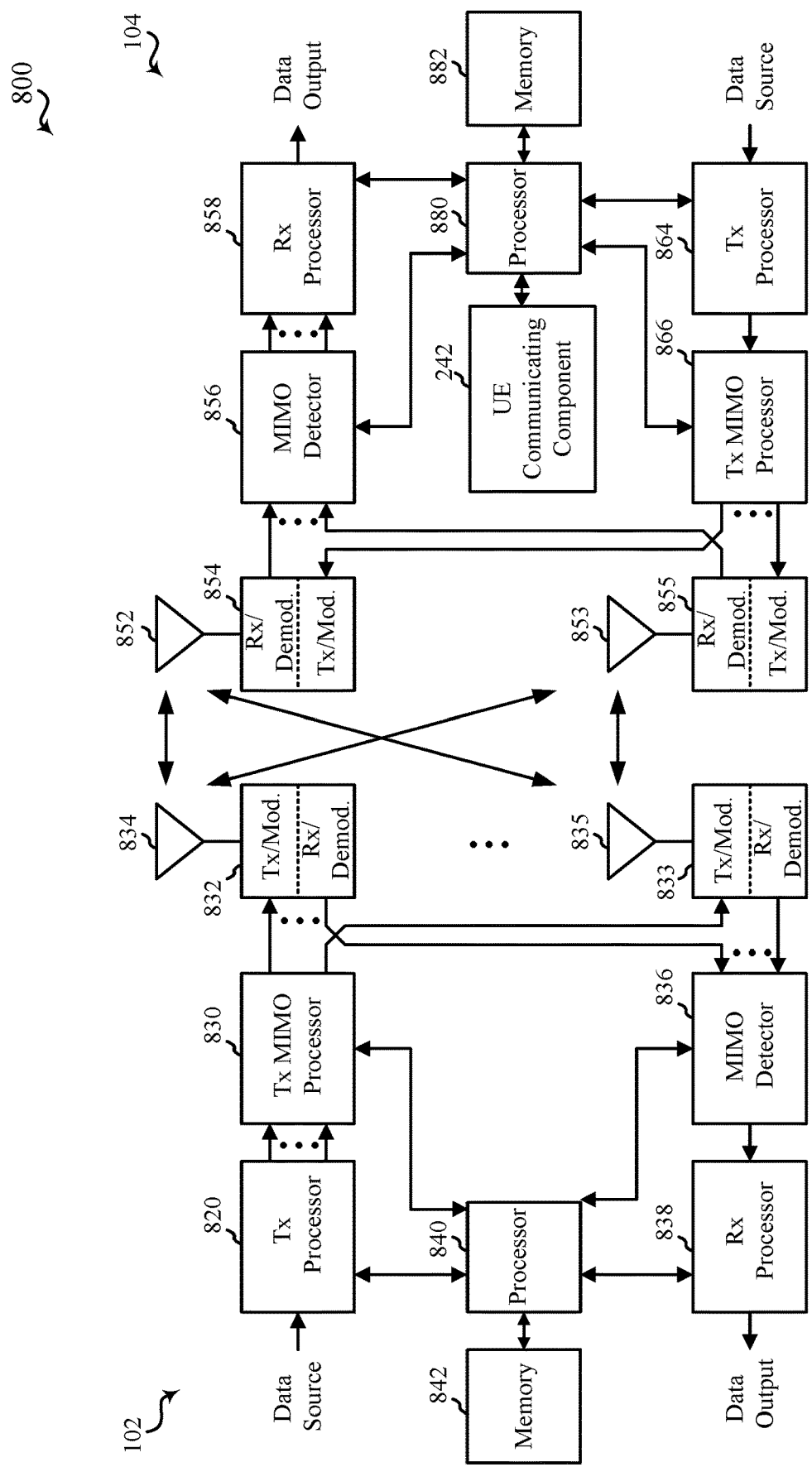
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a UE communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 is a method of wireless communication at a UE including communicating with multiple cells based on two separate subscriptions stored at the UE in a DSDS mode, switching to communicate with the multiple cells in a DSDA mode, transmitting, to at least one of the multiple cells and based on a number of component carriers allowed for a subscription being exceeded by switching to communicate in the DSDA mode, assistance information to indicate a threshold amount of component carriers for the UE, and transmitting, to at least one of the multiple cells and based on the number of component carriers allowed for the subscription being exceeded by switching to communicate in the DSDA mode, a channel quality indicator (CQI) value for one or more cells of the multiple cells to request deactivation of one or more component carriers with, or release of, the one or more cells.

In Aspect 2, the method of Aspect 1 includes switching back to communicate with the two cells in the DSDS mode, transmitting, to the at least one of the multiple cells and based on a number of component carriers allowed for a first subscription of the two separate subscriptions not being exceeded by switching to communicate in the DSDS mode, assistance information to indicate a second threshold amount of component carriers for the UE, transmitting, to the at least one of the multiple cells and based on a number of component carriers allowed for the first subscription of the two separate subscriptions not being exceeded by switching to communicate in the DSDS mode, a first valid CQI value for a first portion of the one or more cells of the multiple cells to request activation of one or more component carriers with, or configuration of, the first portion of the one or more cells, transmitting, to the at least one of the multiple cells and based on a number of component carriers allowed for a second subscription of the two separate subscriptions not being exceeded by switching to communicate in the DSDS mode, assistance information to indicate the second threshold amount of component carriers for the UE, and transmitting, to the at least one of the multiple cells and based on a number of component carriers allowed for the second subscription of the two separate subscriptions not being exceeded by switching to communicate in the DSDS mode, a second valid CQI value for a second portion of the one or more cells of the multiple cells to request activation of one or more component carriers with, or configuration of, the second portion of the one or more cells.

In Aspect 3, the method of Aspect 2 includes receiving, for at least the first portion of the one or more cells or the second portion of the one or more cells, a command to activate one or more CCs based on transmitting the assistance information or the first or second valid CQI value.

In Aspect 4, the method of any of Aspects 1 to 3 includes where transmitting the assistance information includes transmitting, to the at least one of the multiple cells, the assistance information in radio resource control signaling.

In Aspect 5, the method of Aspect 4 includes where the assistance information includes an indication of a preferred maximum number of CCs.

In Aspect 6, the method of any of Aspects 4 or 5 includes where the assistance information includes an overheating indication to reduce a maximum number of CCs to avoid an overheating condition at the UE.

In Aspect 7, the method of any of Aspects 1 to 6 includes selecting, from the multiple cells, the one or more cells for which to transmit the CQI value based on at least one of a throughput or a bandwidth of an active bandwidth part for the one or more cells.

In Aspect 8, the method of Aspect 7 includes where the one or more cells are deactivated, refraining from reporting the CQI value for the one or more cells.

In Aspect 9, the method of any of Aspect 7 includes where the one or more cells are not deactivated, reporting a valid CQI value for the one or more cells.

In Aspect 10, the method of any of Aspects 1 to 9 includes where the CQI value is zero to cause the deactivation of the one or more component carriers, or release of, the one or more cells.

In Aspect 11, the method of any of Aspects 1 to 10 includes where the number of component carriers includes a number of component carriers multiplied by a number of MIMO layers supported by the UE.

In Aspect 12, the method of Aspect 11 includes transmitting, based on the number of component carriers allowed for a subscription being exceeded by switching to communicate in the DSDA mode, a first rank indicator value to reduce the number of MIMO layers with the one or more cells.

In Aspect 13, the method of Aspect 12 includes switching back to communicate with the two cells in the DSDS mode, transmitting, to the at least one of the multiple cells and based on a number of component carriers allowed for a first subscription of the two separate subscriptions not being exceeded by switching to communicate in the DSDS mode, assistance information to indicate a second threshold amount of component carriers for the UE, and transmitting, to the at least one of the multiple cells and based on a number of component carriers allowed for the first subscription of the two separate subscriptions not being exceeded by switching to communicate in the DSDS mode, a first valid CQI value for a first portion of the one or more cells of the multiple cells to request activation of one or more component carriers with, or configuration of, the first portion of the one or more cells, or transmitting, to the at least one of the multiple cells and based on a number of component carriers allowed for the first subscription of the two separate subscriptions not being exceeded by switching to communicate in the DSDS mode, a second rank indicator value to increase the number of MIMO layers with the first portion of the one or more cells, and transmitting, to the at least one of the multiple cells and based on a number of component carriers allowed for a second subscription of the two separate subscriptions not being exceeded by switching to communicate in the DSDS mode, assistance information to indicate the second threshold amount of component carriers for the UE, and transmitting, to the at least one of the multiple cells and based on a number of component carriers allowed for the second subscription of the two separate subscriptions not being exceeded by switching to communicate in the DSDS mode, a second valid CQI value for a second portion of the one or more cells of the multiple cells to request activation of one or more component carriers with, or configuration of, the second portion of the one or more cells, or transmitting, to the at least one of the multiple cells and based on a number of component carriers allowed for the first subscription of the two separate subscriptions not being exceeded by switching to communicate in the DSDS mode, a third rank indicator value to increase the number of MIMO layers with the second portion of the one or more cells.

Aspect 14 is an apparatus for wireless communication including a transceiver, a memory configured to store instructions, and one or more processors communicatively coupled with the memory and the transceiver, wherein the one or more processors are configured to perform one or more of the methods of any of Aspects 1 to 13.

Aspect 15 is an apparatus for wireless communication including means for performing one or more of the methods of any of Aspects 1 to 13.

Aspect 16 is a computer-readable medium including code executable by one or more processors for wireless communications, the code including code for performing one or more of the methods of any of Aspects 1 to 13.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a transceiver;
   a memory configured to store instructions; and
   one or more processors communicatively coupled with the memory and the transceiver, wherein the one or more processors are configured to:
   communicate with multiple cells based on two separate subscriptions stored at the apparatus in a dual subscription dual standby (DSDS) mode;
   switch to communicate with the multiple cells in a dual subscription dual active (DSDA) mode;
   transmit, to at least one of the multiple cells and based on a number of component carriers allowed for a subscription being exceeded by switching to communicate in the DSDA mode, assistance information to indicate a threshold amount of component carriers for the apparatus; and
   transmit, to at least one of the multiple cells and based on the number of component carriers allowed for the subscription being exceeded by switching to communicate in the DSDA mode, a channel quality indicator (CQI) value for one or more cells of the multiple cells to request deactivation of one or more component carriers with, or release of, the one or more cells.

2. The apparatus of claim 1, wherein the one or more processors are further configured to:
   switch back to communicate with the two cells in the DSDS mode;
   transmit, to the at least one of the multiple cells and based on a number of component carriers allowed for a first subscription of the two separate subscriptions not being exceeded by switching to communicate in the DSDS mode, assistance information to indicate a second threshold amount of component carriers for the apparatus;

transmit, to the at least one of the multiple cells and based on a number of component carriers allowed for the first subscription of the two separate subscriptions not being exceeded by switching to communicate in the DSDS mode, a first valid CQI value for a first portion of the one or more cells of the multiple cells to request activation of one or more component carriers with, or configuration of, the first portion of the one or more cells;

transmit, to the at least one of the multiple cells and based on a number of component carriers allowed for a second subscription of the two separate subscriptions not being exceeded by switching to communicate in the DSDS mode, assistance information to indicate the second threshold amount of component carriers for the apparatus; and transmit, to the at least one of the multiple cells and based on a number of component carriers allowed for the second subscription of the two separate subscriptions not being exceeded by switching to communicate in the DSDS mode, a second valid CQI value for a second portion of the one or more cells of the multiple cells to request activation of one or more component carriers with, or configuration of, the second portion of the one or more cells.

3. The apparatus of claim 2, wherein the one or more processors are further configured to receive, for at least the first portion of the one or more cells or the second portion of the one or more cells, a command to activate the one or more component carriers (CCs) based on transmitting at least one of the assistance information or the first or second valid CQI value.

4. The apparatus of claim 1, wherein the one or more processors are configured to transmit the assistance information to the at least one of the multiple cells in radio resource control signaling.

5. The apparatus of claim 4, wherein the assistance information includes an indication of a preferred maximum number of component carriers (CCs).

6. The apparatus of claim 4, wherein the assistance information includes an overheating indication to reduce a maximum number of component carriers (CCs) to avoid an overheating condition at the apparatus.

7. The apparatus of claim 1, wherein the one or more processors are further configured to select, from the multiple cells, the one or more cells for which to transmit the CQI value based on at least one of a throughput or a bandwidth of an active bandwidth part for the one or more cells.

8. The apparatus of claim 7, wherein the one or more processors are further configured to, where the one or more cells are deactivated, refrain from reporting the CQI value for the one or more cells.

9. The apparatus of claim 7, wherein the one or more processors are further configured to, where the one or more cells are not deactivated, report a valid CQI value for the one or more cells.

10. The apparatus of claim 1, wherein the CQI value is zero to cause the deactivation of the one or more component carriers, or release of, the one or more cells.

11. The apparatus of claim 1, wherein the number of component carriers includes a number of component carriers multiplied by a number of multiple-input multiple-output (MIMO) layers supported by the apparatus.

12. The apparatus of claim 11, wherein the one or more processors are further configured to transmit, based on the number of component carriers allowed for a subscription being exceeded by switching to communicate in the DSDA mode, a first rank indicator value to reduce the number of MIMO layers with the one or more cells.

13. The apparatus of claim 12, wherein the one or more processors further are configured to:

switch back to communicate with the two cells in the DSDS mode;

transmit, to the at least one of the multiple cells and based on a number of component carriers allowed for a first subscription of the two separate subscriptions not being exceeded by switching to communicate in the DSDS mode, assistance information to indicate a second threshold amount of component carriers for the apparatus; and transmit, to the at least one of the multiple cells and based on a number of component carriers allowed for the first subscription of the two separate subscriptions not being exceeded by switching to communicate in the DSDS mode, a first valid CQI value for a first portion of the one or more cells of the multiple cells to request activation of one or more component carriers with, or configuration of, the first portion of the one or more cells; or transmit, to the at least one of the multiple cells and based on a number of component carriers allowed for the first subscription of the two separate subscriptions not being exceeded by switching to communicate in the DSDS mode, a second rank indicator value to increase the number of MIMO layers with the first portion of the one or more cells; and transmit, to the at least one of the multiple cells and based on a number of component carriers allowed for a second subscription of the two separate subscriptions not being exceeded by switching to communicate in the DSDS mode, assistance information to indicate the second threshold amount of component carriers for the apparatus; and transmit, to the at least one of the multiple cells and based on a number of component carriers allowed for the second subscription of the two separate subscriptions not being exceeded by switching to communicate in the DSDS mode, a second valid CQI value for a second portion of the one or more cells of the multiple cells to request activation of one or more component carriers with, or configuration of, the second portion of the one or more cells; or transmit, to the at least one of the multiple cells and based on a number of component carriers allowed for the first subscription of the two separate subscriptions not being exceeded by switching to communicate in the DSDS mode, a third rank indicator value to increase the number of MIMO layers with the second portion of the one or more cells.

14. A method of wireless communication at a user equipment (UE), comprising:

communicating with multiple cells based on two separate subscriptions stored at the UE in a dual subscription dual standby (DSDS) mode;

switching to communicate with the multiple cells in a dual subscription dual active (DSDA) mode;

transmitting, to at least one of the multiple cells and based on a number of component carriers allowed for a subscription being exceeded by switching to communicate in the DSDA mode, assistance information to indicate a threshold amount of component carriers for the UE; and transmitting, to at least one of the multiple cells and based on the number of component carriers allowed for the subscription being exceeded by switching to communicate in the DSDA mode, a channel quality indicator (CQI) value for one or more cells of the multiple cells to request deactivation of one or more component carriers with, or release of, the one or more cells.

15. The method of claim 14, further comprising:
switching back to communicate with the two cells in the DSDS mode;
transmitting, to the at least one of the multiple cells and based on a number of component carriers allowed for a first subscription of the two separate subscriptions not being exceeded by switching to communicate in the DSDS mode, assistance information to indicate a second threshold amount of component carriers for the UE;
transmitting, to the at least one of the multiple cells and based on a number of component carriers allowed for the first subscription of the two separate subscriptions not being exceeded by switching to communicate in the DSDS mode, a first valid CQI value for a first portion of the one or more cells of the multiple cells to request activation of one or more component carriers with, or configuration of, the first portion of the one or more cells;
transmitting, to the at least one of the multiple cells and based on a number of component carriers allowed for a second subscription of the two separate subscriptions not being exceeded by switching to communicate in the DSDS mode, assistance information to indicate the second threshold amount of component carriers for the UE; and
transmitting, to the at least one of the multiple cells and based on a number of component carriers allowed for the second subscription of the two separate subscriptions not being exceeded by switching to communicate in the DSDS mode, a second valid CQI value for a second portion of the one or more cells of the multiple cells to request activation of one or more component carriers with, or configuration of, the second portion of the one or more cells.

16. The method of claim 15, further comprising receiving, for at least the first portion of the one or more cells or the second portion of the one or more cells, a command to activate the one or more component carriers (CCs) based on transmitting at least one of the assistance information or the first or second valid CQI value.

17. The method of claim 14, wherein transmitting the assistance information includes transmitting, to the at least one of the multiple cells, the assistance information in radio resource control signaling.

18. The method of claim 17, wherein the assistance information includes an indication of a preferred maximum number of component carriers (CCs).

19. The method of claim 17, wherein the assistance information includes an overheating indication to reduce a maximum number of component carriers (CCs) to avoid an overheating condition at the UE.

20. The method of claim 14, further comprising selecting, from the multiple cells, the one or more cells for which to transmit the CQI value based on at least one of a throughput or a bandwidth of an active bandwidth part for the one or more cells.

21. The method of claim 20, further comprising, where the one or more cells are deactivated, refraining from reporting the CQI value for the one or more cells.

22. The method of claim 20, further comprising, where the one or more cells are not deactivated, reporting a valid CQI value for the one or more cells.

23. The method of claim 14, wherein the CQI value is zero to cause the deactivation of the one or more component carriers, or release of, the one or more cells.

24. The method of claim 14, wherein the number of component carriers includes a number of component carriers multiplied by a number of multiple-input multiple-output (MIMO) layers supported by the UE.

25. The method of claim 24, further comprising transmitting, based on the number of component carriers allowed for a subscription being exceeded by switching to communicate in the DSDA mode, a first rank indicator value to reduce the number of MIMO layers with the one or more cells.

26. The method of claim 25, further comprising:
switching back to communicate with the two cells in the DSDS mode;
transmitting, to the at least one of the multiple cells and based on a number of component carriers allowed for a first subscription of the two separate subscriptions not being exceeded by switching to communicate in the DSDS mode, assistance information to indicate a second threshold amount of component carriers for the UE; and
transmitting, to the at least one of the multiple cells and based on a number of component carriers allowed for the first subscription of the two separate subscriptions not being exceeded by switching to communicate in the DSDS mode, a first valid CQI value for a first portion of the one or more cells of the multiple cells to request activation of one or more component carriers with, or configuration of, the first portion of the one or more cells; or
transmitting, to the at least one of the multiple cells and based on a number of component carriers allowed for the first subscription of the two separate subscriptions not being exceeded by switching to communicate in the DSDS mode, a second rank indicator value to increase the number of MIMO layers with the first portion of the one or more cells; and
transmitting, to the at least one of the multiple cells and based on a number of component carriers allowed for a second subscription of the two separate subscriptions not being exceeded by switching to communicate in the DSDS mode, assistance information to indicate the second threshold amount of component carriers for the UE; and
transmitting, to the at least one of the multiple cells and based on a number of component carriers allowed for the second subscription of the two separate subscriptions not being exceeded by switching to communicate in the DSDS mode, a second valid CQI value for a second portion of the one or more cells of the multiple cells to request activation of one or more component carriers with, or configuration of, the second portion of the one or more cells; or
transmitting, to the at least one of the multiple cells and based on a number of component carriers allowed for the first subscription of the two separate subscriptions not being exceeded by switching to communicate in the DSDS mode, a third rank indicator value to increase the number of MIMO layers with the second portion of the one or more cells.

27. An apparatus for wireless communication, comprising:

means for communicating with multiple cells based on two separate subscriptions stored at the apparatus in a dual subscription dual standby (DSDS) mode;

means for switching to communicate with the multiple cells in a dual subscription dual active (DSDA) mode;

means for transmitting, to at least one of the multiple cells and based on a number of component carriers allowed for a subscription being exceeded by switching to communicate in the DSDA mode, assistance information to indicate a threshold amount of component carriers for the apparatus; and means for transmitting, to at least one of the multiple cells and based on the number of component carriers allowed for the subscription being exceeded by switching to communicate in the DSDA mode, a channel quality indicator (CQI) value for one or more cells of the multiple cells to request deactivation of one or more component carriers with, or release of, the one or more cells.

28. The apparatus of claim 27, further comprising:

means for switching back to communicate with the two cells in the DSDS mode;

means for transmitting, to the at least one of the multiple cells and based on a number of component carriers allowed for a first subscription of the two separate subscriptions not being exceeded by switching to communicate in the DSDS mode, assistance information to indicate a second threshold amount of component carriers for the apparatus;

means for transmitting, to the at least one of the multiple cells and based on a number of component carriers allowed for the first subscription of the two separate subscriptions not being exceeded by switching to communicate in the DSDS mode, a first valid CQI value for a first portion of the one or more cells of the multiple cells to request activation of one or more component carriers with, or configuration of, the first portion of the one or more cells;

means for transmitting, to the at least one of the multiple cells and based on a number of component carriers allowed for a second subscription of the two separate subscriptions not being exceeded by switching to communicate in the DSDS mode, assistance information to indicate the second threshold amount of component carriers for the apparatus; and means for transmitting, to the at least one of the multiple cells and based on a number of component carriers allowed for the second subscription of the two separate subscriptions not being exceeded by switching to communicate in the DSDS mode, a second valid CQI value for a second portion of the one or more cells of the multiple cells to request activation of one or more component carriers with, or configuration of, the second portion of the one or more cells.

29. A computer-readable medium, comprising code executable by one or more processors for wireless communications by a user equipment (UE), the code comprising code for:

communicating with multiple cells based on two separate subscriptions stored at the UE in a dual subscription dual standby (DSDS) mode;

switching to communicate with the multiple cells in a dual subscription dual active (DSDA) mode;

transmitting, to at least one of the multiple cells and based on a number of component carriers allowed for a subscription being exceeded by switching to communicate in the DSDA mode, assistance information to indicate a threshold amount of component carriers for the UE; and transmitting, to at least one of the multiple cells and based on the number of component carriers allowed for the subscription being exceeded by switching to communicate in the DSDA mode, a channel quality indicator (CQI) value for one or more cells of the multiple cells to request deactivation of one or more component carriers with, or release of, the one or more cells.

30. The computer-readable medium of claim 29, further comprising code for:

switching back to communicate with the two cells in the DSDS mode;

transmitting, to the at least one of the multiple cells and based on a number of component carriers allowed for a first subscription of the two separate subscriptions not being exceeded by switching to communicate in the DSDS mode, assistance information to indicate a second threshold amount of component carriers for the UE;

transmitting, to the at least one of the multiple cells and based on a number of component carriers allowed for the first subscription of the two separate subscriptions not being exceeded by switching to communicate in the DSDS mode, a first valid CQI value for a first portion of the one or more cells of the multiple cells to request activation of one or more component carriers with, or configuration of, the first portion of the one or more cells;

transmitting, to the at least one of the multiple cells and based on a number of component carriers allowed for a second subscription of the two separate subscriptions not being exceeded by switching to communicate in the DSDS mode, assistance information to indicate the second threshold amount of component carriers for the UE; and transmitting, to the at least one of the multiple cells and based on a number of component carriers allowed for the second subscription of the two separate subscriptions not being exceeded by switching to communicate in the DSDS mode, a second valid CQI value for a second portion of the one or more cells of the multiple cells to request activation of one or more component carriers with, or configuration of, the second portion of the one or more cells.

* * * * *